(12) United States Patent
Sugden et al.

(10) Patent No.: US 7,857,089 B1
(45) Date of Patent: Dec. 28, 2010

(54) ADJUSTABLE PUMP CONTROL LINKAGE FOR PUMP DRIVEN VEHICLE

(75) Inventors: David J. Sugden, Horicon, WI (US); Eric J. Seitter, Derby, CT (US); Matthew Mugan, West Bend, WI (US)

(73) Assignee: Metalcraft of Mayville, Inc., Mayville, WI (US)

( * ) Notice: Subject to any disclaimer, the term of this patent is extended or adjusted under 35 U.S.C. 154(b) by 230 days.

(21) Appl. No.: 12/046,769

(22) Filed: Mar. 12, 2008

(51) Int. Cl.
*B60K 17/14* (2006.01)

(52) U.S. Cl. .................................. 180/305; 280/93.502
(58) Field of Classification Search ............ 280/93.502; 180/305, 306, 307, 308
See application file for complete search history.

(56) References Cited

U.S. PATENT DOCUMENTS

| | | | | |
|---|---|---|---|---|
| 3,500,633 A * | 3/1970 | Livezey | ........................ | 60/389 |
| 4,787,195 A * | 11/1988 | Wenzel | ........................ | 56/11.1 |
| 4,969,533 A * | 11/1990 | Holm et al. | .................. | 180/273 |
| 5,297,379 A * | 3/1994 | Smith | ........................ | 56/11.8 |
| 5,355,661 A * | 10/1994 | Tomiyama | .................. | 56/10.8 |
| 6,354,388 B1 * | 3/2002 | Teal et al. | ...................... | 180/6.2 |
| 6,434,917 B1 * | 8/2002 | Bartel | .......................... | 56/11.3 |
| 6,658,831 B2 * | 12/2003 | Velke et al. | .................. | 56/14.7 |
| 6,874,308 B1 * | 4/2005 | Bartel | .......................... | 56/16.2 |
| 7,478,689 B1 * | 1/2009 | Sugden et al. | ............. | 180/19.3 |
| 2005/0011696 A1 * | 1/2005 | Bares et al. | .................. | 180/315 |
| 2008/0136134 A1 * | 6/2008 | McCoid et al. | ......... | 280/93.502 |

* cited by examiner

*Primary Examiner*—Jeffrey J Restifo

(57) ABSTRACT

The effective length of pump control linkage assembly of a pump-driven vehicle such as a zero-turn lawnmower can be adjusted without directly manipulating a rod or similar member forming the major length of the assembly. The length instead can be adjusted from above with a simple tool such as a screwdriver or wrench using a knob or similar device. In one embodiment, the linkage assembly includes a rod having a top end and a bottom end. The bottom end is attached to the pump. The top end of the rod is received by an internally threaded insert which is housed in a housing. The internally threaded insert includes an engagement structure such as a hex head for mating with the tool. Upon rotation of the insert using the tool, the insert rotates to drive the rod into or out of the insert and, thereby, vary the effective length of the linkage assembly.

18 Claims, 5 Drawing Sheets

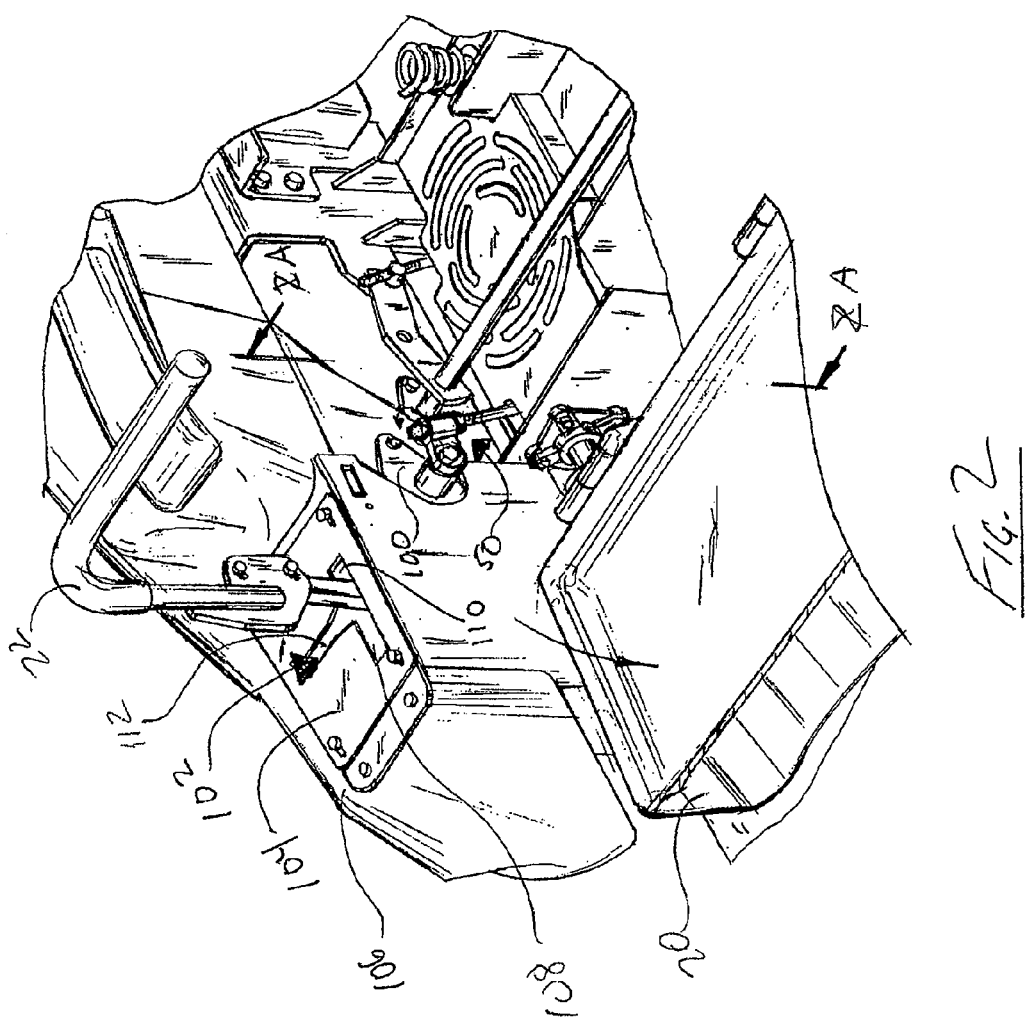

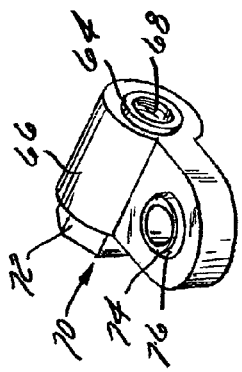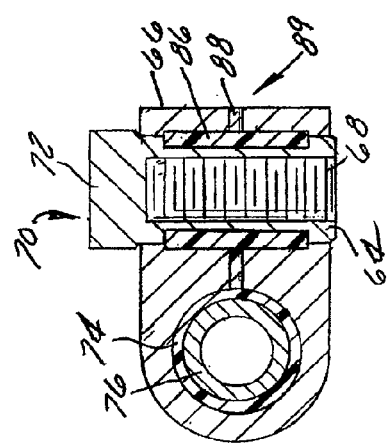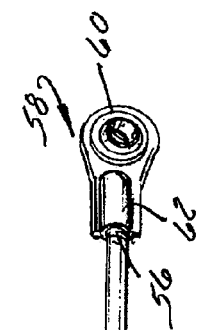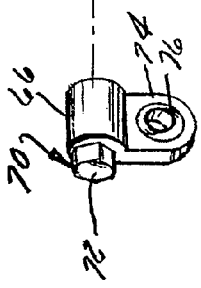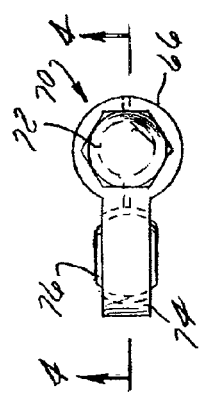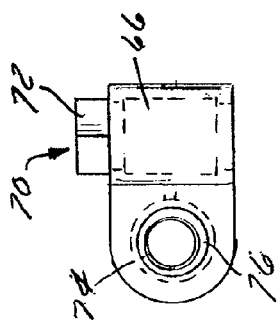

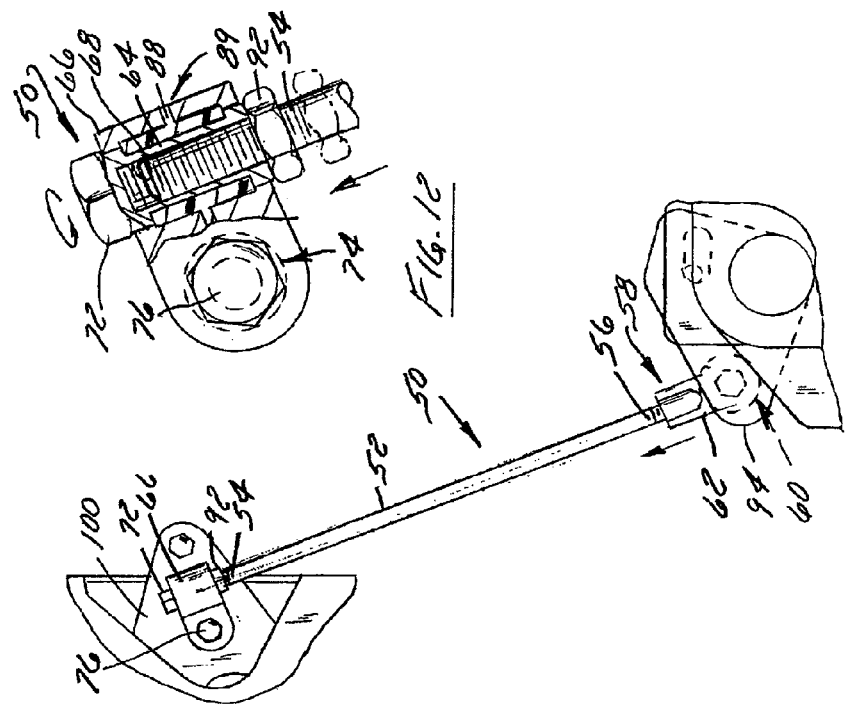
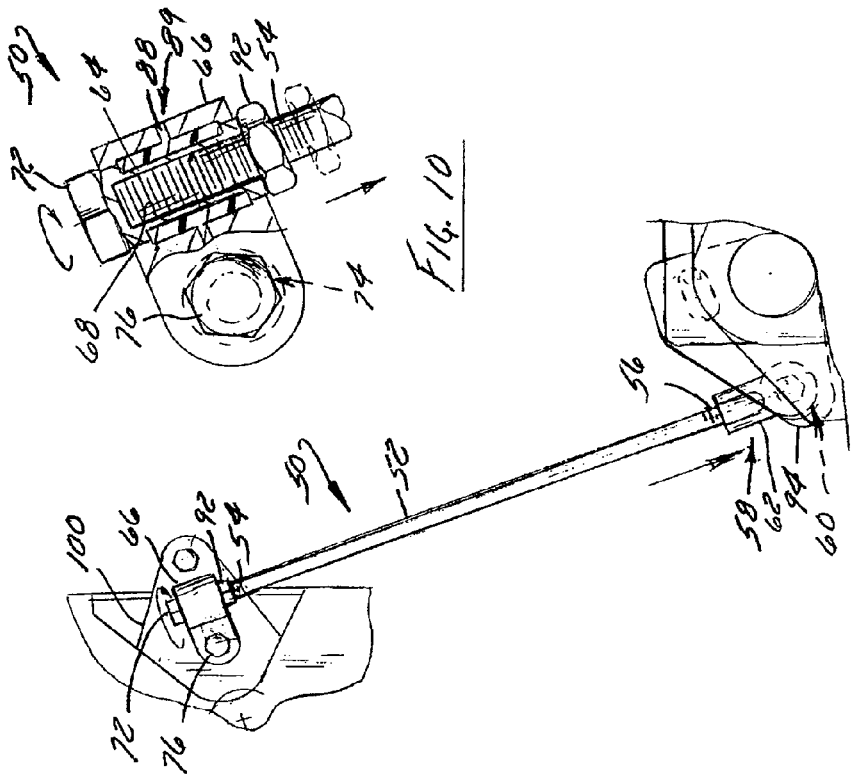

ADJUSTABLE PUMP CONTROL LINKAGE FOR PUMP DRIVEN VEHICLE

BACKGROUND OF THE INVENTION

1. Field of the Invention

The invention relates to vehicles powered and steered by pumps. More particularly, the invention relates to an improved pump control linkage assembly for a pump driven vehicle such as a lawnmower.

2. Discussion of the Related Art

Vehicles equipped with hydraulically-powered drive systems that propel the drive wheels of a vehicle are generally known and are common and include, but are not limited to, walk behind lawnmowers, stand-on lawnmowers, and riding lawnmowers. Turning is typically achieved or at least facilitated by driving each drive wheel at different speeds. In some vehicles, they can even be turned in different directions at equal speeds for a very sharp or even a "zero-turn" radius, where the vehicle pivots about the midpoint of drive wheel axis. This kind of drive wheel steering system is more maneuverable than traditional vehicle steering systems that do not vary the relative speed of the drive wheels or that do not counter-rotate the drive wheels.

Hydraulically-powered drive systems typically include a separate variable displacement hydraulic pump for each of the drive wheels. Each variable displacement pump is typically an axial-piston type pump which includes a tilting internal swash plate which can be manipulated by an external lever to vary the pump discharge rate from a zero flow, also referred to as neutral, up to a maximum flow or reverse direction flow to a particular maximum. Such pumps are controlled by an operator controlled steering mechanism. The steering mechanism, sometimes taking the form of a pair of pivoting levers, is usually coupled to each of the pumps by a dedicated pump control linkage assembly configured to independently control the displacement of the pumps on either side of the vehicle. In this type of system, each steering lever is movable either forwardly or rearwardly from a center, neutral position to adjust the pump position for corresponding forward or reward driving.

Adjustment of the effective length of the pump linkage assembly is sometimes necessary to properly calibrate the linkage assembly with respect to the pump. For instance, during assembly of the vehicle, the linkage assembly length may be improperly set. Further, during operation, the linkage assembly may be jostled and otherwise disturbed so as to cause the linkage assembly length to be affected. The neutral position of the pump swash plate may also vary slightly over time. As such, the pumps of the vehicle may become uncentered such that, when the lever is positioned in neutral, the vehicle may experience a certain amount of unwanted forward or backward creep.

Traditional linkage assemblies of this type generally comprise a conventional turnbuckle located beneath the operator's seat and accessible by tilting the seat upwardly and forwardly. Each turnbuckle generally has an upper end connected to the control lever and a lower end connected to a pump swash plate and a rod disposed therebetween. A pair of jamb nuts or other such fasteners are typically employed to hold the turnbuckle assemblies in place. To adjust the linkage assembly length in such systems, both of the jamb nuts must be loosened and the rod itself must be turned to either extend or reduce the distance between the turnbuckle and the ends. This adjustment method can be quite difficult in operation because the lower end of the turnbuckle and even the rod can be very difficult to access because they are obstructed by the frame, the seat, and other components of the lawnmower.

The need therefore exists to provide a pump control, linkage assembly for a pump-driven vehicle that is easy to assembly, simple to maintain, and is robust enough to withstand the rigors associated with operation of such systems.

The need also exists for a pump control linkage assembly that can be quickly and efficiently assembled and maintained.

SUMMARY OF THE INVENTION

In accordance with a first aspect of the invention, at least one of the above-identified needs is met by providing a pump control linkage assembly the effective length of which can be adjusted without directly moving a rod or similar member forming the major length of the assembly. The length instead can be adjusted from above with a simple tool such as a screwdriver or wrench or, conceivably, by hand using knob or similar device.

In one embodiment, the link includes a rod having a top end and a bottom end. The bottom end is attached to the pump. The top end of the rod is received by an internally threaded insert which is housed in a housing. The internally threaded insert includes an access point for mating with a tool. Upon rotation of the insert using the tool, the insert rotates to drive the rod into or out of the insert and, thereby, vary the effective length of the linkage assembly.

In one embodiment, a ball joint housing is provided on one side of the internally threaded insert in the pivoting housing. The ball joint housing is configured for receiving an end of a pin having a ball joint affixed to a first end thereof.

Another aspect of the invention includes injecting a filler into the housing through a cross-bore that extends horizontally through the housing. The filler serves to secure the internally threaded insert and the housing in place within the pivoting housing.

The rod may, if desired, be locked in place by way of a jamb nut which is configured to secure the rod against the internally threaded insert within the pivoting housing. In operation, the jamb nut is simply loosened when an adjustment to the linkage assembly is desired and tightened thereafter.

Another aspect of a preferred embodiment of the present invention includes configuring an internally threaded insert of an embodiment of the assembly so as to be held in a pivoting housing so as to be rotatable relative to the housing. Further, the internally threaded insert is preferably restrained from moving axially with respect to the housing.

In another aspect of the present invention, a pump-driven utility vehicle such as a lawnmower includes a frame, an engine supported on the frame, and at least one hydraulic pump driven by the engine. The vehicle further includes at least one steering mechanism in communication with the hydraulic pump. The steering mechanism is coupled to the hydraulic pump by way of a pump control linkage assembly configured at least generally as described above.

In yet another aspect of the present invention, a method of adjusting a pump neutral position in a pump-driven utility vehicle includes first positioning a steering mechanism such as a control lever of the vehicle in a neutral position. Once the steering mechanism is in the neutral position, the user makes a determination as to whether an adjustment to the pump neutral position is necessary by observing whether the vehicle creeps forward or backward when in the neutral position. If an adjustment is desired, the user manipulates a portion of the linkage assembly other than the rod or other elongated link forming the major length of the linkage assembly. In one embodiment, the user uses a hex wrench or similar such tool to turn a connector of the linkage assembly to thereby drive the link of the linkage assembly into or out of the connector so as to selectively shorten or lengthen the effective length of the linkage assembly.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which:

FIG. 2 is a perspective view of a portion of the linkage assembly of FIG. 1;

FIG. 2A is a sectional elevation view taken generally along lines 2A-2A in FIG. 2;

FIG. 3 is a top plan view of a pivoting housing of the linkage assembly;

FIG. 4 is a sectional side elevation view taken generally along the lines 4-4 in FIG. 3;

FIG. 5 is a side elevation view of the pivoting housing of FIGS. 3 and 4;

FIG. 6 is a perspective view of the pivoting housing of FIGS. 3-5;

FIG. 8 is a partially exploded perspective view of the linkage assembly;

FIG. 9 is an elevation view of the linkage assembly as installed on the vehicle and showing extension adjustment of the linkage assembly;

FIG. 10 is a partial sectional view of the linkage assembly during the adjustment shown in FIG. 9;

FIG. 11 is an elevation view of the linkage assembly as installed on the vehicle and showing extension adjustment of the linkage assembly; and FIG. 12 is a partial sectional view of the linkage assembly during the adjustment shown in FIG. 11.

DETAILED DESCRIPTION OF THE PREFERRED EMBODIMENTS

An adjustable pump control linkage assembly constructed in accordance with a preferred embodiment of the invention is described below in connection with a riding pump-driven vehicle such as a riding lawnmower. It should be understood that the illustrated adjustable pump linkage assembly and others constructed in accordance with the invention could be used with other riding lawnmowers, other walk behind or ride-on lawnmowers, or other pump-driven utility vehicles.

Figure 1:
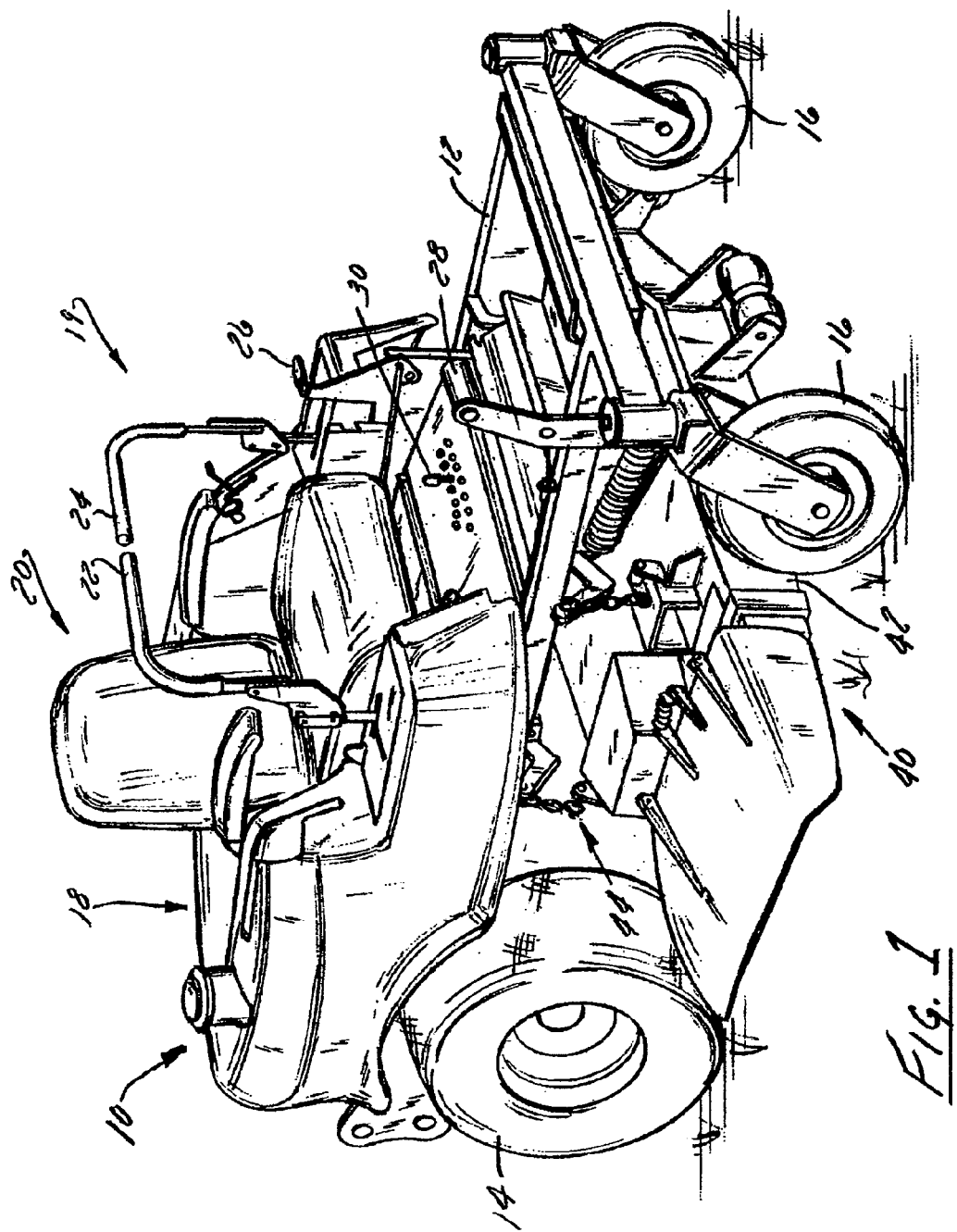
FIG. 1 is a perspective view of a pump driven vehicle equipped with a pump control linkage assembly according to a preferred embodiment of the present invention.
Figure 7A:
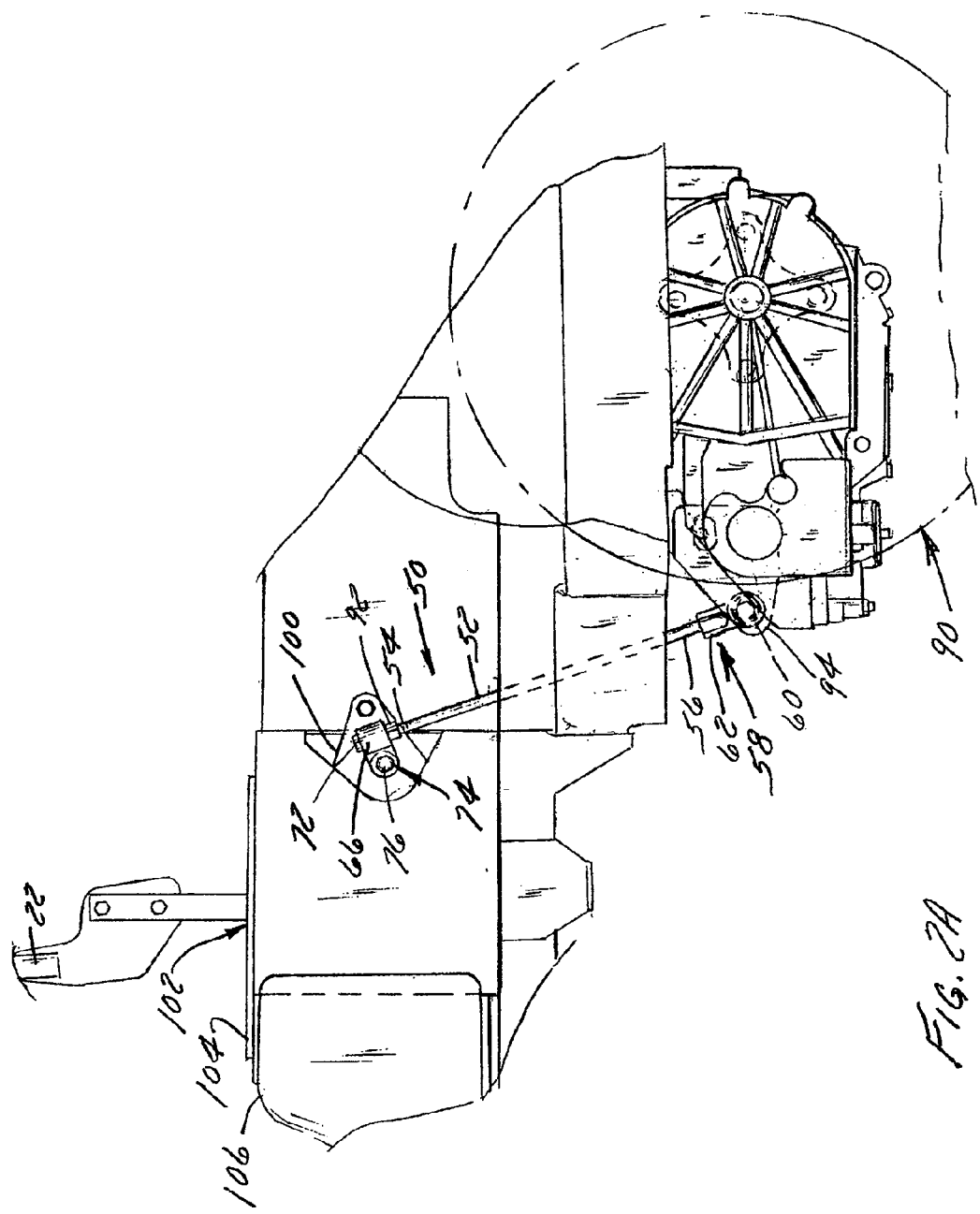
FIG. 7 is perspective view of the linkage assembly.

Referring initially to FIG. 1, a pump powered vehicle in the form of a zero-turn lawnmower 10 includes a frame 12 supported on driven rear wheels 14 and undriven front wheels or casters 16, an engine 18 mounted on the rear of the frame 12, an operator's seat 20 mounted on the frame 12 in front of engine 18, and operator's controls 19. The operator's controls 19 include a steering mechanism for steering the vehicle. The steering mechanism could, for example, be a steering wheel or one or more levers. In the illustrated embodiment, two steering mechanisms are provided in the form left and right steering levers 22, 24, described in more detail below. The operator's controls 19 additionally include a brake handle 26, a deck lift pedal 28, and a hand operated latch 30. A cutter deck assembly 40 is located generally centrally of the frame 12 and includes as its principal components a cutter deck 42 and a deck suspension system 44 that suspends the cutter deck 42 from lawnmower frame 12.

The vehicle 10 is powered by left and right steering systems, each of which includes a pump and a steering lever 22 or 24 that can be manually manipulated to control a pump to propel the associated rear wheel forwardly or rearwardly at a rate corresponding to the stroke of the associated steering lever 22 or 24 from a neutral position thereof. The steering lever 22, 24 of each steering system is coupled to the associated pump by a steering control linkage assembly constructed in accordance a preferred embodiment of the present invention. Since the left and right steering systems are mirror images of each other, the right system will now be described, it being understood the description applies equally to the left system.

Turning now to FIGS. 1, 2, and 2A, the right steering control system includes the steering lever 22, a pump 90, and a pump control linkage assembly 50 constructed in accordance with a preferred embodiment of the invention. The upper end of the pump control linkage assembly 50 is mounted on a plate 100 that is articulated to the frame 12 so as to pivot upon pivoting movement of the control lever 22. As best seen in FIG. 2, the control lever 22 is guided for this pivoting movement by traversing a T-shaped slot 102 formed in a plate 104 on a horizontal panel 106 disposed adjacent to the right front corner of the, seat 20. The slot 102 has fore and aft legs 108 and 110 through which the control lever 22 can pivot to control the pump 90 to propel the associated wheel forwardly or rearwardly at a speed corresponding to the stroke of the lever 22. The slot 102 also has a central lateral leg 112 into which the control lever 22 can pivot in its neutral position. When the pump control linkage assembly 50 is the proper length, the pump 90 will not propel the vehicle 10 in either direction when the control lever 22 is in this neutral position.

Referring to FIG. 2A, pump 90 comprises an axial-piston type pump including an internal tilting swash plate coupled to an external lever 94. Lever 94 can be rotated to vary the pump discharge rate from zero flow, also referred to as neutral, up to a maximum flow in either a forward or reverse direction. The bottom end of the pump control linkage assembly 50 is connected to the lever 94 so as to rotate lever 94 upon control lever pivoting. In order to assure the desired operation of the machine 10, the effect of length of the pump control linkage assembly 50 must be set to maintain these swash plate in its neutral position when the control lever 22 is pivoted into the lateral leg 112 of slot 102.

Turning to FIGS. 3-8, a pump control linkage assembly 50 constructed in accordance with a preferred embodiment of the present invention includes a central link in the form of a rod 52 having an externally threaded upper end 54 and an externally threaded lower end 56. It is conceivable, however, that the entire link or at least one end thereof could be formed from an internally threaded tube mating with a correspondingly externally threaded component. In the illustrated embodiment, lower end 56 is coupled to a connector in the form of a turnbuckle section 58. Turnbuckle section 58 has a lower end 60 and an upper end 62 that threadedly receives lower end 56 of rod 52. Lower end 60 is attached to the pump lever 94 as best seen in FIG. 2A. Upper end 62 of turnbuckle section 58 preferably is crimped or otherwise mechanically coupled to lower end 56 of rod 52 such that the lower end 56 of central rod 52 is restrained from movement therein. A significant advantage of this embodiment of the present invention is the elimination of a jamb nut at lower end 56 of central rod 52. Hence, the effective length of the pump linkage assembly 50 can be adjusted without having to access the lower end 56 of the rod 52 or the turnbuckle section 58. This is particularly advantageous in that the lower end of the linkage assembly 50 is typically difficult for users to reach. Thus, by mechanically locking turnbuckle section 58 to the lower end 56 of rod 52 and configuring the linkage assembly so that all adjustments are made at the upper end, adjustment of the effective length of linkage assembly 50 is made significantly easier.

Upper end 54 of central rod 52 is screwed into another connector which, in this embodiment, takes the form of an internally threaded insert 64. Internally threaded insert 64 includes a lower end 68 in which upper end 54 of central rod 52 is received and an upper end 70 having a tool engagement structure such as a hex head 72 for engagement by a wrench or a slot for engagement by a screwdriver. Internally threaded insert 64 is held in a pivoting housing 66 so as to be rotatable relative to the housing 66 but is restrained from axial movement with respect thereto. Pivoting housing 66 further includes a ball joint housing 74 that receives a ball joint 76 positioned to one side of insert 64. Ball joint 76 is affixed to a first end of a pin (not shown). The pin further comprises a second end attached to frame 12 of the vehicle 10, thereby securing the upper end of the linkage assembly 50. A spacer (not shown) is preferably provided between the housing 66 and frame 12 and surrounds the pin.

As best seen in FIGS. 4, 10, and 12, ball joint housing 74 and internal threaded insert 64 are preferably axially fixed in place in pivoting housing 66 by a retainer formed from a nylon filler 86 or other such filler. Nylon filler 86 is injected into pivoting housing 66 through a cross bore 88 that extends horizontally into the pivoting housing 66 from an opening 89 formed on the outer wall of the housing 66.

Still referring to FIGS. 9-12, the central rod 52 may be locked in place by way of an optional jamb nut 92 or other such fastener positioned on upper end 54 of rod 52.

Turning to FIGS. 9-12, adjustment of linkage assembly 50 of the present invention is shown. Referring initially to FIGS. 9 and 10, the linkage assembly 50 is shown as being adjusted so as to increase the effective length of the linkage assembly 50. Specifically, as can be seen clearly from FIG. 10, hex head 72 is shown as being turned in a counter-clockwise direction. As a result of the turning of hex head 72, threaded upper end 54 is advanced out of internal threaded insert 64, hence increasing the extent to which the rod 52 extends from the insert and increasing the effective length of the linkage assembly 50 to rotate the lever 94 counterclockwise.

Referring now to FIGS. 11 and 12, the shortening of the effective length of the linkage assembly 50 of the present invention is shown. As can be clearly seen from FIG. 12, hex head 72 is rotated in a clockwise manner so as to draw the upper end 54 of central rod 52 further into insert 64, thereby applying a generally upward force on the rod 52 and rotating the lever 94 clockwise.

It can thus be seen that the present invention allows a user to adjust the effective length of the pump linkage assembly 50 at one point, namely, the hex head of insert 64, rather than, as in prior designs, by manually turning the central rod 52. As it is often difficult to reach and turn central rod 52, the present invention makes adjusting the effective length of the pump control linkage easier.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

We claim:

1. A pump control linkage assembly for a pump-propelled vehicle, the pump control linkage assembly having a first end operatively connected to a pump of the vehicle and a second end operatively coupled to an operator-controlled steering mechanism, the pump control linkage comprising:

a link having first and second opposed ends;

first and second connectors connected to the first and second ends of the link, respectively, the first connector being operatively coupled to the pump and the second connector being operatively coupled to the steering mechanism; and a housing on which the second connector is rotatably mounted, wherein the second end of the link and the second connector threadedly mate with one another so that the second connector can be rotated relative to the housing and the second end of the link so as extend or retract the link relative to the second connector and, thereby, lengthen or shorten an effective length of the pump control linkage assembly without rotating the link.

2. The pump control linkage assembly of claim 1, wherein the second connector comprises an internally threaded insert mounted on the housing, and wherein the link comprises a rod having an externally threaded second end.

3. The pump control linkage assembly of claim 2, further comprising an engagement structure, located on the insert and accessible by a tool, which can be rotated by a tool to rotate the insert to extend or retract the link relative to the insert.

4. The pump control linkage assembly of claim 2, wherein the housing is pivotally mounted on a frame.

5. The pump control linkage assembly of claim 2, further comprising a jamb nut mounted on the second end of the rod.

6. The pump control linkage assembly of claim 2, wherein the internally threaded insert is held in the housing so as to be restrained from axial movement relative to the housing.

7. The pump control linkage assembly of claim 1, wherein the first end of the linkage assembly is a lower end and the second end is an upper end.

8. The pump control linkage assembly of claim 1, wherein the first connector comprises a turnbuckle segment.

9. A pump control linkage assembly for a pump-propelled vehicle, the pump control linkage assembly having a first end operatively connected to a pump of the vehicle and a second end operatively coupled to an operator-controlled steering mechanism, the pump control linkage comprising:

a link having first and second opposed ends; and first and second connectors connected to the first and second ends of the link, respectively, the first connector being operatively coupled to the pump and the second connector being operatively coupled to the steering mechanism; and a housing on which the second connector is mounted, wherein the second end of the link and the second connector threadedly mate with one another so that the second connector can be rotated relative to the housing and the second end of the link so as extend or retract the link relative to the second connector and, thereby, lengthen or shorten an effective length of the pump control linkage assembly, wherein the second connector comprises an internally threaded insert mounted on the housing, wherein, the link comprises a rod having an externally threaded second end, wherein the internally threaded insert is held in the housing so as to be restrained from axial movement relative to the housing, and wherein the internally threaded insert is held in the housing by a filler injected into the housing through a cross bore extending horizontally through the housing to secure the internally threaded insert and a ball joint housing within the housing.

10. A pump-driven vehicle comprising:
a frame;
an engine supported on the frame;
at least one hydraulic pump driven by the engine;
at least one manually operated steering mechanism; and
a pump control linkage assembly operationally coupling the steering mechanism to the pump, wherein the pump control linkage assembly comprises
  a link having first and second opposed ends,
  first and second connectors connected to the first and second ends of the link, respectively, the first connector being operatively coupled to the pump and the second connector being operatively coupled to the steering mechanism, and
  a housing on which the second connector is rotatably mounted, wherein the second end of the link and the second connector threadedly mate with one another so that the second connector can be rotated relative to the housing and the second end of the link so as extend or retract the link relative to the second connector and, thereby, lengthen or shorten an effective length of the pump control linkage assembly without rotating the link.

11. The vehicle of claim 10, wherein the second connector comprises an internally threaded insert mounted on the housing, and wherein the link comprises a rod having an externally threaded second end.

12. The vehicle of claim 11, further comprising an engagement structure, located on the insert and accessible by a tool, which can be rotated by the tool to rotate the insert to extend or retract the link relative to the insert.

13. The vehicle of claim 11, wherein the housing is pivotally mounted on the frame.

14. The vehicle of claim 11, wherein the internally threaded insert is held in the housing so as to be restrained from axial movement relative to the housing.

15. The vehicle of claim 14, wherein the vehicle is a lawnmower.

16. The vehicle of claim 15, wherein the steering device is a pivotable lever.

17. A pump-driven vehicle comprising:
a frame;
an engine supported on the frame;
at least one hydraulic pump driven by the engine;
at least one manually operated steering mechanism; and
a pump control linkage assembly operationally coupling the steering mechanism to the pump, wherein the pump control linkage assembly comprises
  a link having first and second opposed ends,
  first and second connectors connected to the first and second ends of the link, respectively, the first connector being operatively coupled to the pump and the second connector being operatively coupled to the steering mechanism, and
  a housing on which the second connector is mounted, wherein the second end of the link and the second connector threadedly mate with one another so that the second connector can be rotated relative to the housing and the second end of the link so as extend or retract the link relative to the second connector and, thereby, lengthen or shorten an effective length of the pump control linkage assembly, wherein
  the second connector comprises an internally threaded insert mounted on the housing, and wherein the link comprises a rod having an externally threaded second end, wherein
  the internally threaded insert is held in the housing so as to be restrained from axial movement relative to the housing, and wherein
  the internally threaded insert is held in the housing by a filler injected into the housing through a cross bore extending horizontally through the housing to secure the internally threaded insert and a ball joint housing within the housing.

18. A lawnmower comprising:
a frame;
an engine supported on the frame;
at least one hydraulic pump driven by the engine;
at least one manually pivotable steering lever; and
a pump control linkage assembly operationally coupling the steering lever to the pump, wherein the pump control linkage assembly comprises
  a link having lower and upper opposed ends,
  lower and upper connectors connected to the lower and upper ends of the link, respectively, the lower connector being operatively coupled to the pump and the upper connector being operatively coupled to the steering device, and
  a housing on which the upper connector is mounted so as to be rotatably movable but axially immovable relative thereto, wherein the upper end of the link and the upper connector threadedly mate with one another so that the upper connector can be rotated relative to the housing and the upper end of the link so as extend or retract the link relative to the upper connector and, thereby, lengthen or shorten the effectively length of the pump control linkage assembly without rotating the link.

* * * * *